Patented Dec. 15, 1925.

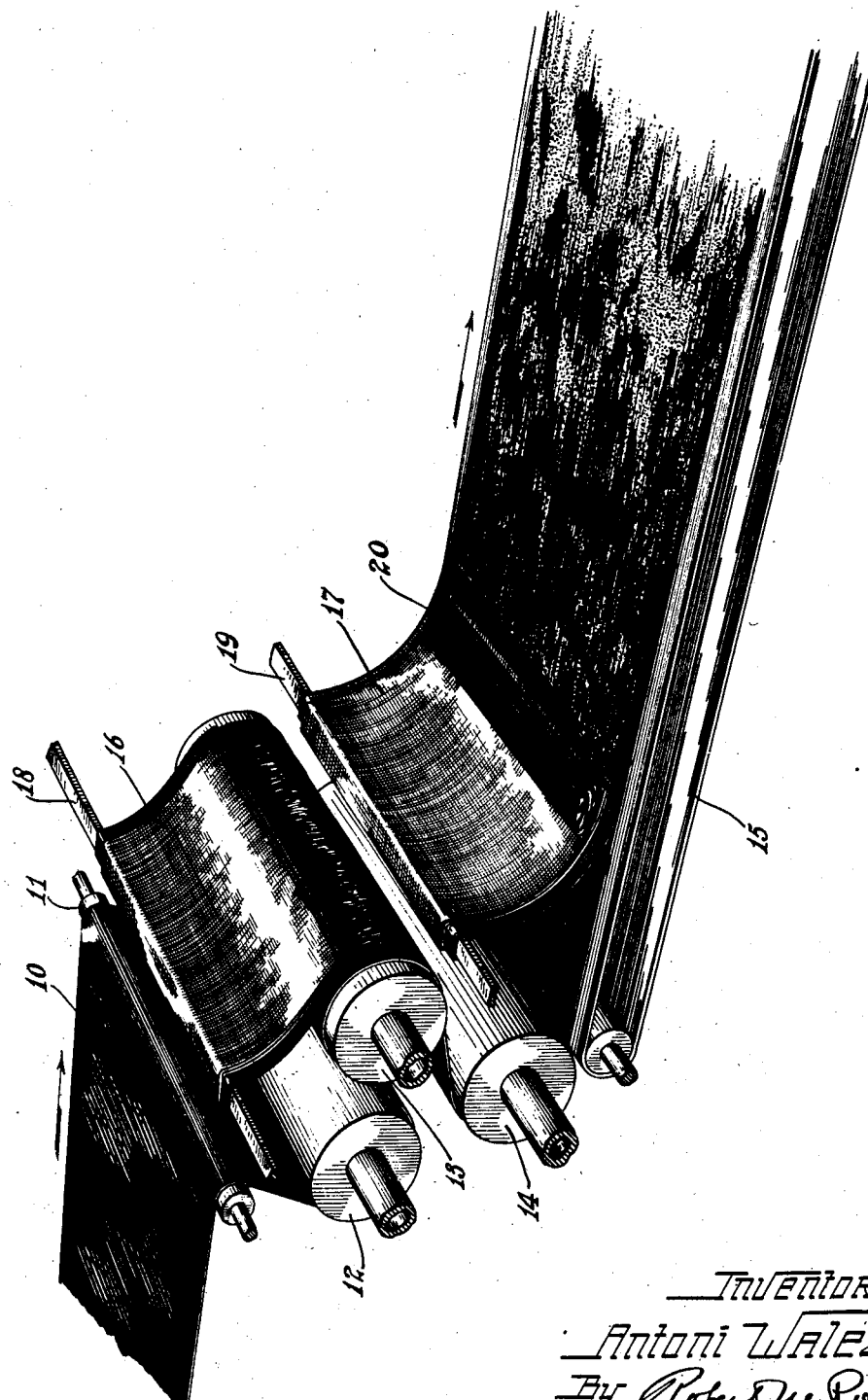

1,565,535

UNITED STATES PATENT OFFICE.

ANTONI WALEZAK, OF AKRON, OHIO, ASSIGNOR TO THE B. F. GOODRICH COMPANY, OF NEW YORK, N. Y., A CORPORATION OF NEW YORK.

METHOD AND APPARATUS FOR REDUCING ADHESIVENESS OF PLASTIC MATERIAL.

Application filed January 26, 1924. Serial No. 688,888.

*To all whom it may concern:*

Be it known that I, ANTONI WALEZAK, a citizen of the United States, residing at Akron, in the county of Summit and State of Ohio, have invented a certain new and useful Method and Apparatus for Reducing Adhesiveness of Plastic Material, of which the following is a specification.

This invention relates to the art of forming and handling adhesive plastic material such as unvulcanized rubber, as in the preparation of stock for the building of rubber footwear and the like, and its chief object is to provide improved procedure and apparatus for reducing the adhesiveness of such materials, so as to facilitate the handling or manipulation thereof. A more specific object is to avoid adhesion of thin sheeted rubber, such as shoe stock, to itself or to other objects, in the cutting of blanks therefrom and in the building of such blanks into rubber footwear. A further object is so to reduce the adhesiveness of such materials without requiring the use of dusting powders or coating materials such as are commonly used upon various kinds of rubber stock.

Of the accompanying drawing, the single figure is a perspective view, somewhat diagrammatic and with parts omitted for clearness of illustration, of apparatus embodying and adapted to carry out my invention in its preferred form, as applied to thin, sheeted rubbed such as shoe stock.

Referring to the drawing, 10 is a sheet of unvulcanized, initially adhesive or tacky rubber, being drawn from a suitable source of supply such as a calender (not shown), passing over a guide roll 11, which may be loosely journaled, and about a set of spaced-apart cooling rolls 12, 13, 14, said cooling rolls being adapted for the circulation of a cooling fluid therethrough, and preferably being driven to withdraw the fragile rubber sheet from the calender. 15 is an endless belt onto which said rubber sheet passes from said cooling rolls.

I have found that the adhesiveness of the surface of unvulcanized rubber stock may be greatly reduced by the simple expedient of lightly brushing or rubbing such surface with a non-adhesive brushing member, and for this purpose, in the preferred embodiment here shown, I employ woven cotton fabric. Two successive brushing elements, 16, 17, secured to respective supporting bars 18, 19, and adapted to drag upon the same side of the sheet are here employed, the first bearing lightly upon the work and the second more heavily, under the force of a weight 20, so that the adhesiveness of the sheet is substantially reduced by the first brushing element before it is subjected to the greater pressure of the second, sticking of the sheet to either of the brushing elements thus being avoided, while the two successive brushing operations, cumulative in their effect, result in a great reduction in the tackiness of the sheet.

The effect is apparently due in large part to "blooming" of the sulfur contained in the rubber compound, such blooming being induced by the brushing operation, and rapidly becoming more pronounced as the stock is allowed to stand after being brushed as described.

The weight 20 is here shown as consisting of a roll of unvulcanized rubber sheet simply laid upon the dragging portion of the fabric brushing element 17, and each of the brushing elements is shown as consisting of a plurality of plies, affording suitable weight and assuring proper contact of the brushing element with the rubber sheet throughout the latter's width, but my invention is of course not wholly limited to the specific exemplification shown and described, in these or in other respects.

I claim:

1. The method of reducing the adhesiveness of an unvulcanized, compounded rubber which comprises brushing the surface thereof with a non-adhesive brushing element, independently of any application of a coating material to said rubber.

2. The method of reducing the adhesiveness of a strip of sheeted, unvulcanized, compounded rubber which comprises feeding the sheeted strip past a non-adhesive brushing element and holding said element against the rubber strip as the latter is so fed, whereby the adhesiveness of the rubber is reduced independently of any application of a coating material thereto.

3. The method of reducing the adhesiveness of a strip of sheeted, unvulcanized, compounded rubber which comprises lightly brushing the surface thereof and subsequently more heavily brushing said surface, the adhesiveness of the rubber being reduced independently of any application of a coating material thereto.

4. Apparatus for reducing the adhesiveness of a strip of sheeted, unvulcanized, compounded rubber, said apparatus comprising means for feeding said strip, and a flexible, fabric, brushing member adapted to drag upon said strip as it is so fed, said brushing element being adapted to reduce the adhesiveness of said strip independently of any application of a coating material thereto.

5. Apparatus for reducing the adhesiveness of a strip of sheeted, unvulcanized, compounded rubber, said apparatus comprising means for feeding said strip, a flexible brushing member adapted to drag upon said strip as it is so fed, said brushing element being adapted to reduce the adhesiveness of said strip independently of any application of a coating material thereto, and a second brushing element adapted subsequently to bear upon the work.

In witness whereof I have hereunto set my hand this 16th day of January, 1924.

ANTONI WALEZAK.